United States Patent
Zissimopoulos et al.

(10) Patent No.: US 7,320,073 B2
(45) Date of Patent: Jan. 15, 2008

(54) SECURE METHOD FOR ROAMING KEYS AND CERTIFICATES

(75) Inventors: Vasileios Zissimopoulos, San Francisco, CA (US); Ognian Zdravkov Topalov, Santa Clara, CA (US)

(73) Assignee: AOL LLC, Dulles, VA (US)

( * ) Notice: Subject to any disclaimer, the term of this patent is extended or adjusted under 35 U.S.C. 154(b) by 830 days.

(21) Appl. No.: 10/409,339

(22) Filed: Apr. 7, 2003

(65) Prior Publication Data
US 2004/0199774 A1 Oct. 7, 2004

(51) Int. Cl.
*H04L 9/00* (2006.01)
*H04K 1/00* (2006.01)

(52) U.S. Cl. .............. 713/179; 713/155; 713/160; 713/170; 713/182

(58) Field of Classification Search .............. None
See application file for complete search history.

(56) References Cited

U.S. PATENT DOCUMENTS

| | | | |
|---|---|---|---|
| 4,200,770 A | 4/1980 | Hellman et al. ............. 178/22 |
| 4,218,582 A | 8/1980 | Hellman et al. ............. 178/22 |
| 4,424,414 A | 1/1984 | Hellman et al. ......... 178/22.11 |
| 6,154,543 A | 11/2000 | Baltzley ................... 380/255 |
| 6,223,291 B1 | 4/2001 | Puhl et al. ................. 713/201 |
| 6,233,341 B1 | 5/2001 | Riggins ..................... 380/277 |
| 6,236,971 B1 | 5/2001 | Stefik et al. .................... 705/1 |
| 6,263,446 B1 | 7/2001 | Kausik et al. ............. 713/201 |
| 6,292,895 B1 | 9/2001 | Baltzley ................... 713/168 |
| 6,317,829 B1 * | 11/2001 | Van Oorschot ............. 713/155 |
| 6,321,334 B1 | 11/2001 | Jerger et al. ................ 713/200 |
| 6,324,645 B1 | 11/2001 | Andrews et al. ............ 713/157 |
| 6,345,361 B1 | 2/2002 | Jerger et al. ................ 713/200 |
| 6,422,460 B1 | 7/2002 | Boesch ....................... 235/380 |
| 6,463,534 B1 | 10/2002 | Geiger et al. ............... 713/168 |
| 6,473,800 B1 | 10/2002 | Jerger et al. ................ 709/226 |
| 6,834,112 B1 * | 12/2004 | Brickell ...................... 380/279 |

FOREIGN PATENT DOCUMENTS

| | | |
|---|---|---|
| EP | 695 985 | 2/1996 |
| EP | 1 178 644 | 2/2002 |
| WO | WO 00/30285 | 5/2000 |
| WO | WO 01/01627 | 1/2001 |
| WO | WO 01/20484 | 3/2001 |

(Continued)

OTHER PUBLICATIONS

*Arcot Product Overview*; http://www.arcot.com/pro_overview.html, 2001.

(Continued)

*Primary Examiner*—Gilberto Barrón, Jr.
*Assistant Examiner*—Laurel Lashley
(74) *Attorney, Agent, or Firm*—Michael A. Glenn; Glenn Patent Group (57) ABSTRACT

A simple scheme is provided for server storage of private keys and certificates in a secure manner, thus solving the difficult problems of roaming certificates. A user can access his private keys and certificates from anywhere in the network. Despite that the server stores the user's private keys, the server must not be able to impersonate the user on a network or sign messages for the user. A scheme for truly secure transactions is also provided.

11 Claims, 4 Drawing Sheets

FOREIGN PATENT DOCUMENTS

| WO | WO 01/54476 | 8/2001 |
| WO | WO 01/78493 | 10/2001 |
| WO | WO 02/03235 | 1/2002 |
| WO | WO 02/10912 | 2/2002 |
| WO | WO 02/11091 | 2/2002 |
| WO | WO 02/15051 | 2/2002 |
| WO | WO 02/17555 | 2/2002 |
| WO | WO 02/46967 | 6/2002 |

OTHER PUBLICATIONS

*Arcot Webfort*; http://www.arcot.com/webfort.html, 2001.

* cited by examiner

SECURE METHOD FOR ROAMING KEYS AND CERTIFICATES

BACKGROUND OF THE INVENTION

1. Technical Field

This invention relates generally to universal authentication technology. More particularly, the invention relates to a method and system for roaming a Web user's keys and certificates in a secure manner.

2. Description of the Prior Art

To request a service or conduct other electronic transactions in an Internet based network, a user is usually required to go through an authentication process. In other words, the user is required to provide the seller or service provider with some credential information, such as his personal identification, contact information, or even financial information. The authentication process may take from several seconds to several minutes. Because each seller or service provider usually maintains its own authentication server and database, millions of sellers and service providers might share thousands or millions of consumers or users. Some of the consumers or users might be required to go through the same or substantially similar authentication process again and again if they have transactions with many sellers or service providers. This repetitive authentication not only wastes the consumers' time, but also burdens the sellers or service providers because they have to expand their databases to keep detailed authentication information for a growing number of users. This situation brings forth a technical need to create a universal authentication infrastructure using existing client and server technologies, whereby a specific user may be authenticated once for all and the authentication result is widely recognized by a large number of sellers or service providers.

In responding to that need, several approaches have been developed. For example, Microsoft Corporation has introduced a ".NET Passport" single sign-in system. With ".NET Passport" a user does not need to register a member name and password at each affiliated site he visits. The user may simply use his e-mail address and password that registered as his ".NET Passport" to sign in to any participating site of the network. The information the user registers with ".NET Passport" is stored online, securely, in the ".NET Passport" database as the user's ".NET Passport profile." When the user signs in to a ".NET Passport" participating site by typing his e-mail address and password in the ".NET Passport" sign-in box, ".NET Passport" confirms that (1) the e-mail address he entered is registered with ".NET Passport", and (2) the password he entered is correct. ".NET Passport" then notifies the site that the user has provided valid "sign-in credentials," and thus he is given access to the participating site. Once the user signs in to one ".NET Passport" participating site during an Internet session, he can sign in to any other site simply by clicking the ".NET Passport" sign-in button available at the site.

Because of the inherent limitations in the technologies used to implement the solution, the ".NET Passport" scheme has not been widely accepted. In order to assess how well the ".NET Passport" addresses the values mentioned above, let us briefly examine its protocol. It is assumed in the following scenario that the user is visiting a ".NET Passport" participating site and that the user is registered with it, but is not signed into the site, neither is he signed into ".NET Passport":

Step 1: User visits the site's home page;
Step 2: User is redirected to ".NET Passport" hosted sign-in page (for Passport 2.0 the page or the sign-in functionality can be hosted at the participating site);
Step 3: User provides his credentials (user name and password);
Step 4: ".NET Passport" establishes a Web session with the user's browser (passport cookie), and redirects the user back to the participating site;
Step 5: The ".NET Passport" manager at the participating site gets the user's ticket and profile information from the URL query string and establishes the site's Web session (site cookie); and
Step 6: The site grants access to the user.

This protocol suffers from various problems. For examples: (1) among several security and privacy concerns, login pages can be spoofed and various forms of man-in-the-middle attacks are possible (DNS, etc.), not to mention that passport.com itself becomes a very attractive target for crackers; (2) the protocol requires functionality that is Web browser specific, thus making it difficult to implement on non-browser clients or other devices; (3) the double redirect slows down the whole process thus creating a sub-optimal user experience; (4) the central server/domain is a single point of failure; and (5) the cost to integrate with ".NET Passport" is significant and it requires the participating site to give up control of the user experience during authentication.

For a universal authentication solution to become ubiquitous it must offer certain values, such as security, privacy, range, usability, reliability and adoptability. First, it must be impossible for an attacker to steal the user's identity, it must also be impossible for service providers to misuse the user's credentials or impersonate the user on the network. Second, it must provide the user with the ability to control who gets access to his/her identity/credentials. Third, it must work across a range of different clients and devices. Fourth, it must provide for an easy user experience and it must not require any special training or setup from the user's part. Fifth, it must minimize the impact of hardware failures and network outages. And finally, it must minimize the barrier for third-parties to participate in the scheme, thus getting wide adoption.

We have looked at different ways for single sign-on authentication based on a variety of public key protocols. The major shortcoming of these protocols is that deployment of new Web clients is required.

SSL/TLS as an Authentication Protocol

The draft specification for Secure Sockets Layer (SSL) version 3.0 was released in November 1996. The Request for Comments (RFC) for SSL version 3.1 was released in January 1999, by that time SSL had been renamed to Transport Security Layer (TLS).

SSL/TLS is a protocol developed by Netscape for transmitting private documents via the Internet. SSL works by using a public key to encrypt data that is transferred over the SSL connection. The protocol provides privacy by encrypting the data transferred between two computers. It can also provide certificate-based authentication for both parties. Both Netscape Navigator and Internet Explorer support SSL. Many Web sites use the protocol to obtain confidential user information, such as credit card numbers. By convention, URL's that require an SSL connection start with "https:" instead of "http:".

SSL/TLS is most commonly used in the HTTPS protocol, which is really an HTTP over SSL/TLS communication. In the most common mode of HTTPS operation, only the HTTPS server gets authenticated during the initial protocol handshake, the client remains anonymous.

Figure 1:
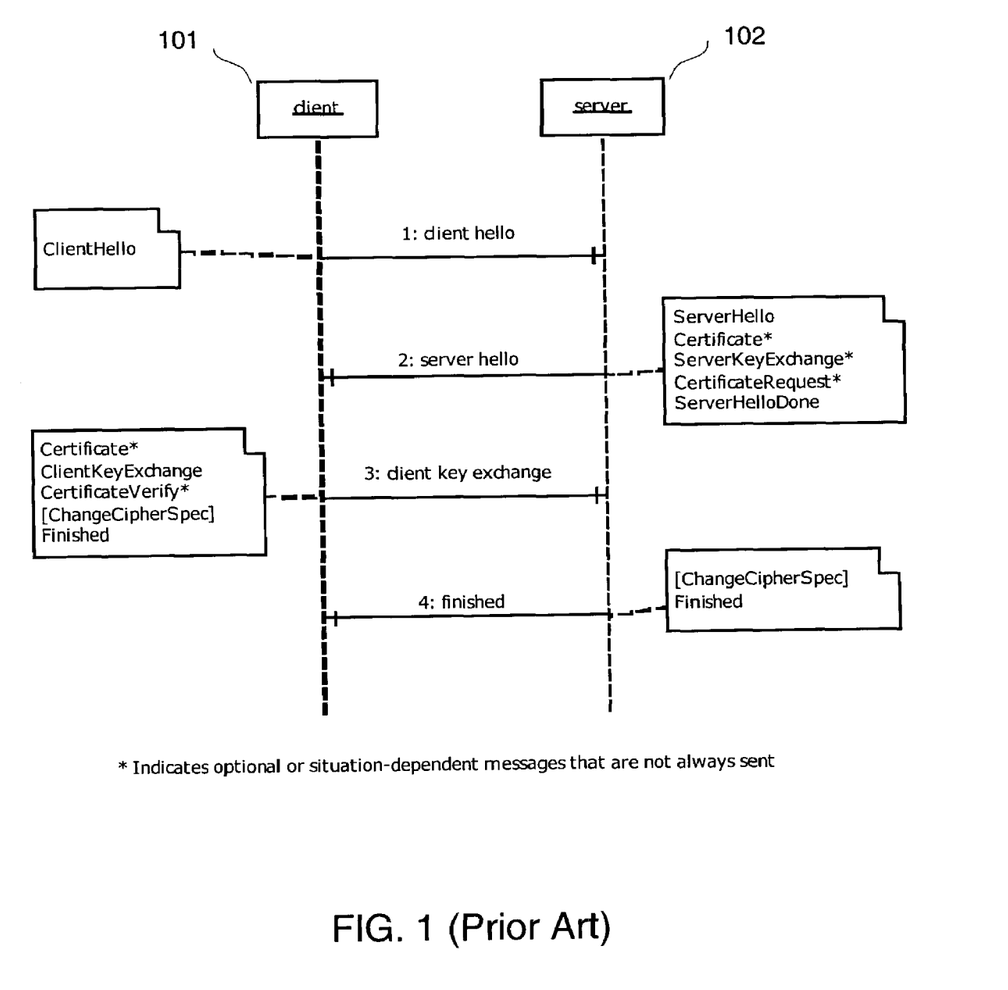
FIG. 1 is a schematic flow diagram illustrating the SSL/TLS client authentication scheme according to sections 7.3 and 7.4 of the TLS RFC.

FIG. 1 is a schematic flow diagram illustrating the SSL/TLS client authentication according to sections 7.3 and 7.4 of the TLS RFC. During the "Step 2: server hello" message, the server 102 may request client authentication using a "CertificateRequest". The client 101 must in this case provide its certificate to the server 102 or it will fail to complete the handshake. The server 102 can now use the distinguished name in the certificate to control client access to different services.

In some more detail, this client authentication scheme is based on the following facts:

Fact 1: The client 101 has a certificate that contains a distinguished name that uniquely identifies the user. The client also has the corresponding private key for the public key contained in the certificate.

Fact 2: During the initial SSL/TLS handshake the server 102 requests client authentication. The client 101 uses the user's private key to digitally sign data collected from the server 102 during the "Step 1: client hello" and "Step 2: server hello" messages. This data includes random data seeded by both the client 101 and the server 102. The client certificate and the signature are sent to the server 102.

Fact 3: The server 102 gets the distinguished name from the client certificate. It first uses the public key in the certificate to verify the client signature, this associates the public key with the private key used to create the signature. To further associate the client 1, which acts on behalf of the user, with the distinguished name in the certificate, the server 102 verifies the digital signature in the client certificate using the public key of the issuing certification authority. This securely associates the distinguished name in the certificate with the certificate public key and therefore with the client signature sent earlier, thus securely identifying the client.

Authentication Across High-level Protocols

It is important to notice that because SSL/TLS functions as a transport protocol and not an application protocol, different applications can benefit from this scheme. For example, SSL/TLS can be used to establish authenticated sessions with news servers or mail servers without the need to reinvent an authentication mechanism for each protocol. Assuming that the client 101 and the server 102 are modified to use SSL/TLS as the transport protocol instead of TCP/IP, the authentication comes for free.

Establishing a Web Session Using HTTPS

HTTP includes a mechanism for state management, which is described in RFC 2965 by T. Kristol and L. Montulli (http://www.ietf.org/rfc/rfc2965.txt). This mechanism, traditionally known as cookies, can be used to identify client state within the server across client requests. Cookies can be shared between HTTP and HTTPS requests in the same domain.

Figure 2:
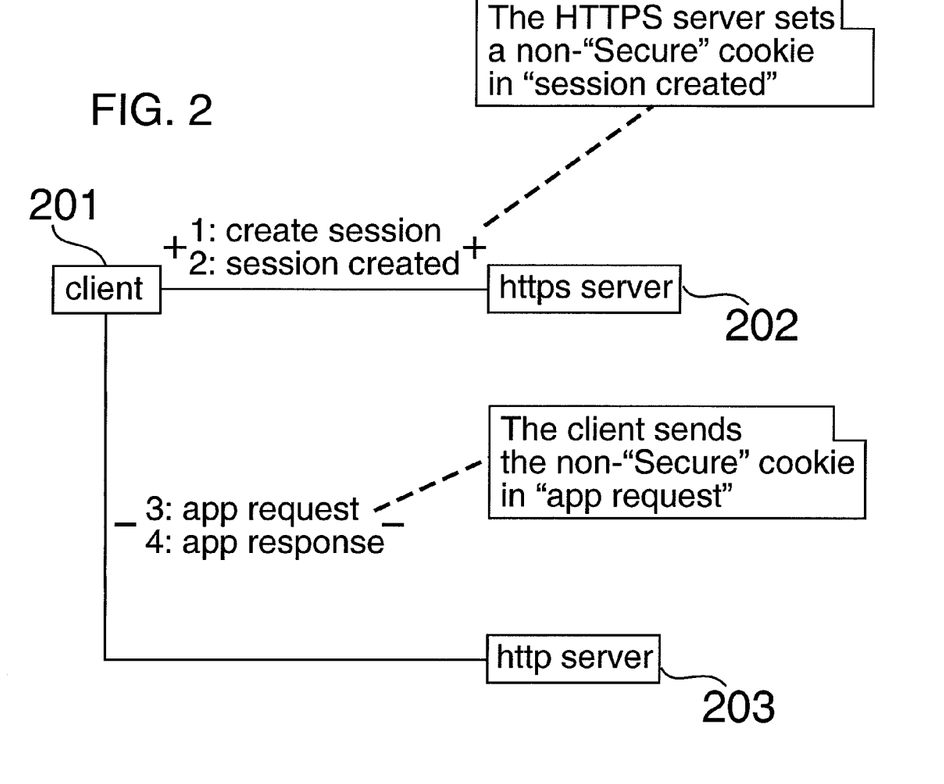
FIG. 2 is a schematic diagram illustrating a Web session establishment protocol.

FIG. 2 is a schematic diagram illustrating a Web session establishment protocol. Client 201 uses HTTPS (HTTP over SSL/TLS) to contact Server 202. During the initial SSL/TLS handshake Server 202 requests a client certificate from Client 201. In order to complete the protocol, Client 201 has to provide the certificate. After the SSL/TLS handshake is complete, Server 202 issues session cookies to Client 101. Specifically, the Web session establishment protocol includes the following steps:

Step 1: Client 201 creates a session;
Step 2: HTTPS server 202 sets a non-secure cookie in the session created by Client 101 and return the cookie to Client 201;
Step 3: Client 201 sends an application request, alone with the non-secure cookie, to HTTP server 203; and
Step 4: HTTP server 203 responds to Client 201's request.

Note that if an application wishes to use HTTPS for authentication and then revert to HTTP for normal operation, an attacker may steal the session ID cookie and thus use it to obtain access to services while the stolen session is active. This is an inherent limitation of insecure communications.

Therefore, the application must not expose or allow the user to manipulate any sensitive information over insecure communications. The application must request client authentication again when switching back to secure communications.

In situations where the application wishes to switch freely between HTTPS and HTTP, two states must be maintained for the client, a secure and a non-secure one. The application must be careful to use the appropriate state for each communication type.

Universal Identifiers

Several user identification schemes have been proposed in the industry, including both centralized and distributed systems. A very successful user identification scheme is already available on the Internet.

RFC 822 was released in August 1982 (David H. Crocker, "Standard for the Format of Arpa Internet Text Messages, http://www.ietf.org/rfc/rfc0822.txt). This RFC documents a format for "ARPA Internet Text Messages" (emails) as well as an address specification for locating "mailboxes". In particular it specifies one address format of the form "localpart@domain". The "localpart" uniquely identifies a mailbox or account within a domain. Because the domain name is unique within the domain system, the whole address is unique.

Note that the domain name in an RFC 822 address is simply a unique path within a universal, logical, hierarchical addressing system and therefore it does not have a direct relationship to the Domain Name System (DNS). In particular, the domain name may not necessarily specify a computer system. DNS provides mapping of such domain names to real computer names through the use of Mail Exchange (MX) records. An MX record is a DNS resource record type indicating which host can handle email for a particular domain.

We propose that universal identifiers may take the forms of RFC 822 addresses. However, we do not propose that the universal identifier for a user is the user's email address. We simply propose that the same addressing scheme be followed. Indeed certain authentication agencies may choose to use the user's email address as the identifier. But it is possible that other authentication agencies may keep the email addresses different from the user's identifiers.

Issuing Certificates

One of the major obstacles in any certificate-based authentication scheme is the issuance of the user certificates. Traditionally this has been a difficult process that requires a lot of effort from the users and the certification authorities. Often the users must go through unintuitive user interfaces/processes to be granted the certificate and at times they even have to physically produce ID documents.

This is important for certain applications, where, for example, the real identity of the certificate holder must be certified. However, in an access control scheme, all that is needed is an identifier that uniquely identifies the user's rights within the system. This identifier is usually called the username or the screen name.

For example, the user's screen name is all that is needed by the AOL service to grant access to the user. The user presents his screen name and he certifies his rights to the screen name with the password. Once the AOL service has verified the validity of the password, the user is free to use all the services that he has access to.

Different users may have different privileges within the system, but that is a question of authorization and not authentication. For example, AOL employees have additional privileges than normal users within the AOL system, but they are still identified by their screen name like normal users.

The important point here is all that is needed to get access to services within a system is an identifier for an account in the system and the user's proof that he has rights to the account. A certificate based solution provides for both in a completely private and secure manner. The distinguished name in the certificate can be simply the system account identifier (username, screen name). Thus it is very simple for the system to issue certificates to its users, simply because all the system has to certify is the account identifier.

For example, AOL can very easily create certificates and private keys for all of its users, because all AOL will be certifying are the screen names of its users.

We therefore propose a scheme where systems that wish to function as authentication agencies issue certificates to their users certifying the account identifiers of their users. Assuming an email-like universal identifier scheme, Bill who has an account with AOL.COM, has a universal identifier of bill@aol.com. AOL.COM certifies this for Bill, it issues a certificate that certifies the distinguished name of bill@aol.com (i.e. whoever "knows" the corresponding private key for the certificate, has access rights to the account "bill" in the AOL.COM system). Similarly, Ognian who has an account with NETSCAPE.COM, has a universal identifier of ognian@netscape.com and NETSCAPE.COM certifies that by issuing a certificate with the distinguished name ognian@netscape.com.

Trust

A service provider that wishes to validate the public key contained in a user's certificate, must hold a copy of the user's certification authority own certificate. This may not be practical in a world with multiple authentication agencies acting as certification authorities for their users. A different trust model is required.

RFC 2459 defines the X.509 "Public Key Infrastructure" standard for Certificates (R. Housley, W. Ford, W. Polk, D. Solo: "Internet X.509 Public Key Infrastructure Certificate and CRL Profile", http://www.ietf.org/rfc/rfc2459.txt). The RFC discusses a hierarchical trust model, where each certification authority has a certificate that has been signed by a more trusted authority. A name subordination rule restricts the names that a particular certification authority can certify (for example AOL.COM can only certify username@AOL.COM). There is at least one universally trusted certification authority which signs its own certificate.

Figure 3:
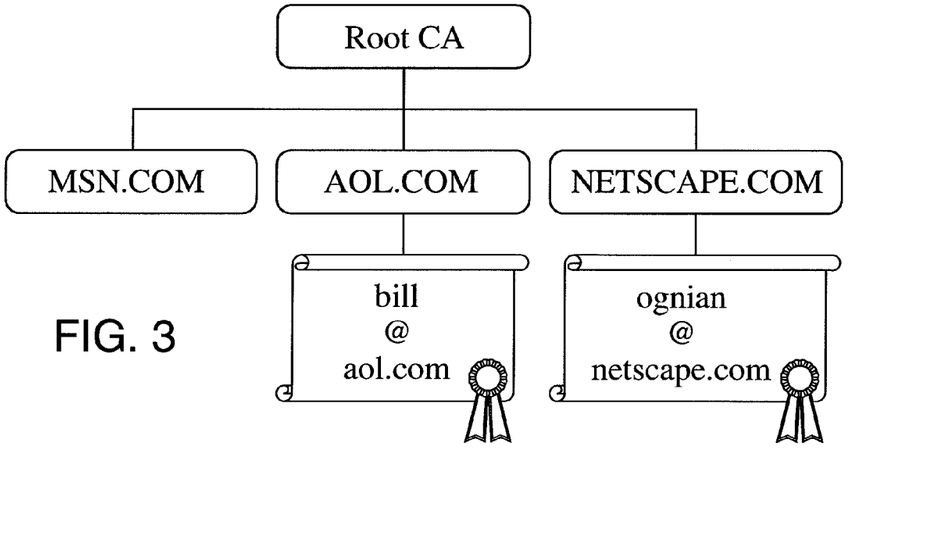
FIG. 3 is a block diagram illustrating an exemplary certificate trust model.

Within the hierarchical trust model there are two approaches of establishing trust across authentication agencies and service providers. In an open, non-controlled world, multiple independent certification authorities get to act as "root certification authorities", thus making it feasible for multiple authentication agencies to easily participate in the network. In a closed, controlled world, there is a single root certification authority, such as MCN.ORG, that controls who can participate. Technically both solutions are equivalent and the decision can be made based purely on business needs. FIG. 3 is block diagram illustrating an exemplary trust model.

User Experience

User experience for client authentication is required to be as easy as possible. In out scheme, when a user first opens the client, he must use his username and password (or passphrase for extra security) to unlock the private key database. Then when a site requests client authentication, the user is presented with a simple dialog box that allows the user to answer whether he wishes to send the certificate to the server. A simple checkbox to "remember this decision" would also be helpful here.

For non-sophisticated users, the client could come with a list of "trusted" sites preinstalled. These sites would be the ones that receive client certificates by default.

We have also examined the major browsers today and we have found that the support for certificate installation and management is quite impressive. It is true that a user might have a vague understanding of what a certificate is and how it is used, but the process has become easy and it is probably quite close to being optimal. Note that the major browsers seem to specifically support external authentication devices such as smartcards.

Therefore, the goal of this invention is to provide a new mechanism for roaming Web user's keys and certificates in a secure manner.

SUMMARY OF THE INVENTION

The invention provides two roaming certificate protocols, one for writing certificate and private key information to a remote server, and the other for reading the information returned from the remote server. Additionally the invention provides a scheme for truly secure transactions.

The protocol for writing certificate and private key information to a remote server comprises the steps of:
  (a) the user choosing a username and a passphrase via a client;
  (b) the client generating a private key and a public key using random data collected from the user and other sources on the client computer;
  (c) calculating a hash of the user's passphrase using a hashing algorithm;
  (d) calculating an authentication value from the private key and the passphrase that is used to provide message integrity for the purpose of ensuring that the message has not been tampered with while in transit;
  (e) encrypting the private key and the authentication value using the passphrase to provide message privacy for the purpose of ensuring that the message content cannot be stolen while in transit;
  (f) submitting the username, along with the hash result, the encryption result and the public key to the server over a secure channel;
  (g) the server locating the user's record in a database associated with the server;
  (h) if there is a user record, check to see whether the hash result matches with the one stored in the user record; if there is no user record create a new one;
  (i) creating and signing a certificate that certifies the username and the public key;

(k) storing the hash result, the encryption result and the certificate in the user's record; and (l) returning a confirmation to the client.

The protocol for reading the certificate and private key information back from the server comprises the steps of:

(a) the client sending the user's username and a first hash result of the user's passphrase to the server over a secure channel;

(b) the server locating the user's record from a database associated with the server;

(c) comparing the first hash result with a stored hash result;

(d) if the first hash result and the stored hash result matches, returning with the user's certificate and a value containing the user's private key and an authentication value created from the user's private key and passphrase;

(e) the client decrypting the encrypted value using the passphrase; and (f) verifying the encrypted authentication value using the passphrase to ensure that the private key has not been tampered with on the server;

wherein if the private key has not been tampered with on the server, the client obtains the user's private key and certificate.

The invention also provides a method for a user to approve electronic transaction in a secure manner and to approve receiving notifications, the method comprising the steps of:

a server preparing a message that describes an intended transaction;

the server sending the message to a client via which the user communicates with the server;

the client presenting a user interface describing the intended transaction to the user, asking the user to make a yes or no decision, wherein the intended transaction is canceled if the user chooses no;

if the user chooses yes, the client signing the message using the user's private key and sending the signed message to the server, wherein both the client and the server seed the message with random values before signing to avoid replay attacks; and the server proceeding to present the signed message to the user's target website.

DETAILED DESCRIPTION OF THE INVENTION

This invention comprises a simple scheme for server storage of private keys and certificates in a secure manner, thus solving the difficult problem of roaming certificates. The requirement is that it should be feasible for the user to access his private keys and certificates from anywhere in the network. Despite that the server stores the user's private keys, the server must not be able to impersonate the user on the network or sign messages for the user.

The scheme according to the preferred embodiment includes two protocols, one for writing certificate and private key information to a remote server, and the other one for reading this information back from the remote server. In the following paragraphs, it is assumed that the user has selected a particular username and a passphrase. The username is denoted with the letter I (Identity) and the passphrase with the letter S (Secret).

Figure 4A:
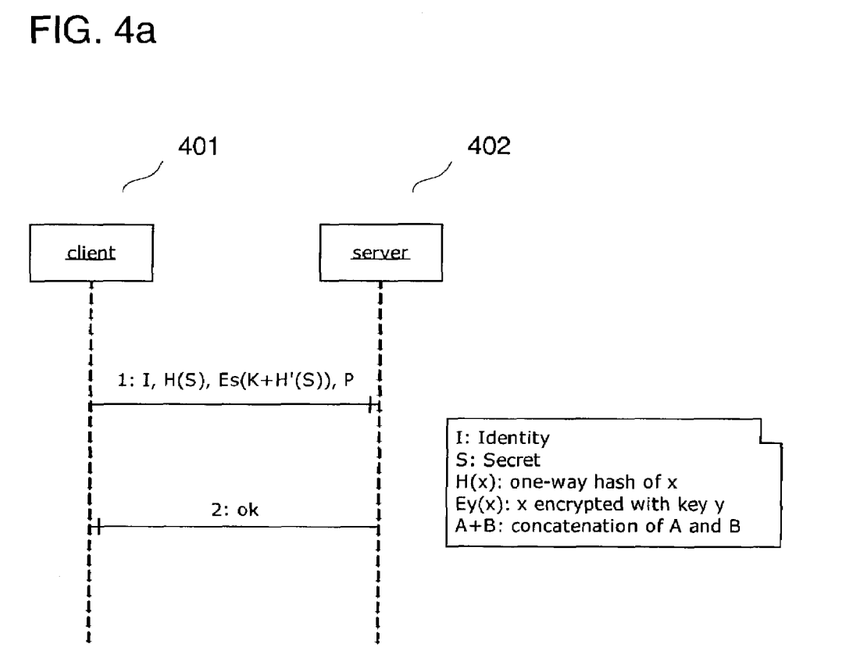
FIG. 4a is a schematic diagram illustrating a protocol for writing certificate and private key information to a remote server according to the invention.

FIG. 4a is a schematic diagram illustrating a protocol for writing certificate and private key information to a remote server. The protocol proceeds as follows:

Step 1: The user chooses a username [I] and a passphrase [S]. The client 401 uses random information collected from the user and other random sources on the client computer such as timestamps, white noise devices, audio input devices, video input devices and other input devices to generate a private-public key [K,P] pair.

Step 2: The client 401 calculates a hash of the user's passphrase: H(s). The client 401 further calculates an authentication value that depends on both the key K and the secret S: As(K). In a typical embodiment, the authentication value As(K) is simply a second hash value H'(S). In another embodiment, the authentication value can be HMACs(K) or other authentication scheme such as a second passphrase. In a circumstance where the authentication value is an HMAC value, the passphrase is used as a key input and the private key is used as a message input to an HMAC algorithm. The client 401 then encrypts the private key and the hash result using the passphrase to protect the private key from eavesdropping and tampering by using encryption and message authentication with the passphrase as a key.

Step 3: The client 401 submits to the server 402 I, H(S), Es(K+As(K)), P, and the server stores the Es(K+As(K)). This communication happens over a secure channel, for example, HTTPS without client authentication. As stated above, As(K) can be H'(S) or HMACs(K) or other authentication value that is derived from the private key K and the passphrase S in a secure fashion.

Step 4: The server 402 uses I to create or locate the user's record inside its database. If the record already exists in the database, the access to the record must be verified with the old secret, i.e. a stored hash value of the passphrase. If the record is not found, then the server 402 creates a record for said user. Then, the server 402 stores H(S), Es(K+As(K)) in the record. Then, it creates and signs a certificate [C] that certifies I, P. And then, it stores C in the user's record.

Step 5: The server 402 returns "ok" to the client 401.

Figure 4B:
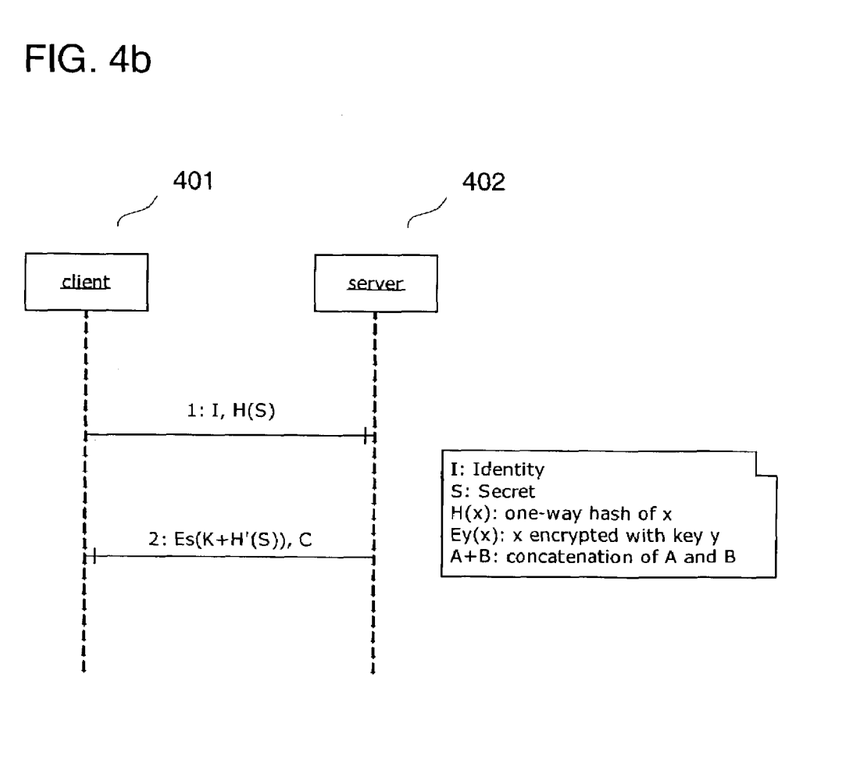
FIG. 4b is a schematic diagram illustrating a protocol for reading the user's certificate and private key information back from the remote server according to the invention.

FIG. 4b is a schematic diagram illustrating a protocol for reading the user's certificate and private key information back from the remote server. The protocol proceeds as follows:

Step 1: The client 401 sends the user's identity [I] and a one-way hash of the passphrase [H(S)] to the server 402. This communication happens over a secure channel, for example, HTTPS without client authentication.

Step 2: The server 402 uses I to locate the user's record inside its database. It verifies access to the record by comparing H(S) with the stored passphrase hash. If the comparison is successful, it responds with the encrypted version of the user's private key [Es(K+As(k))] and the user's certificate [C];

Step 3: The client 401 uses S to decrypt Es(K+As(k)) and obtain K+As(K):

$$K+As(K):=Ds(Es(K+As(K)))$$

Step 4: The client 401 uses the passphrase S to verify As(K) thus ensuring that K has not been tampered with on the server 402; and Step 5: The client now has K and C.

The invention facilitates universal authentication schemes based on certificates, such as SSL/TLS, which as mentioned previously has numerous advantages. The following are some exemplary aspects:

1. Security. Authentication schemes based on public key cryptography and certificates are the most secure that mathematics can give us today. It is impossible for a rogue authentication agency or service provider to steal the user's credentials.

2. Privacy. The user can choose the level of privacy he desires.

3. Range. The scheme works across a variety of clients and application protocols and does not necessarily require any browser specific technologies such as JavaScript or browser redirects.

4. Usability. The user experience is seamless and optimal. Potentially no login dialog is ever presented to the user. If the user chooses a very high level of security, an operating system dialog box is presented to the user to unlock his private key database.

5. Reliability. This scheme does not rely on centralized control. Therefore it suffers much less from single point of failure problems. It is not a requirement for the authentication agency to be up for the scheme to work.

6. Adoption. SSL client authentication is built into every major browser and server out there. Thus no integration effort is required for the third party that wishes to use this scheme to identify users.

The proposed scheme enables a brave new world of applications. Once public key cryptography and certificates become ubiquitous, applications such as truly secure transactions can be developed. Consider the problem of secure payment on the Web, or the very different problem of user notifications. Both problems require somehow the user's consent. The payment problem requires that the user approves the transaction in a secure manner, and the notifications problem requires that the user approves receiving notifications for a particular class of events thus avoiding notification spam.

Figure 5:
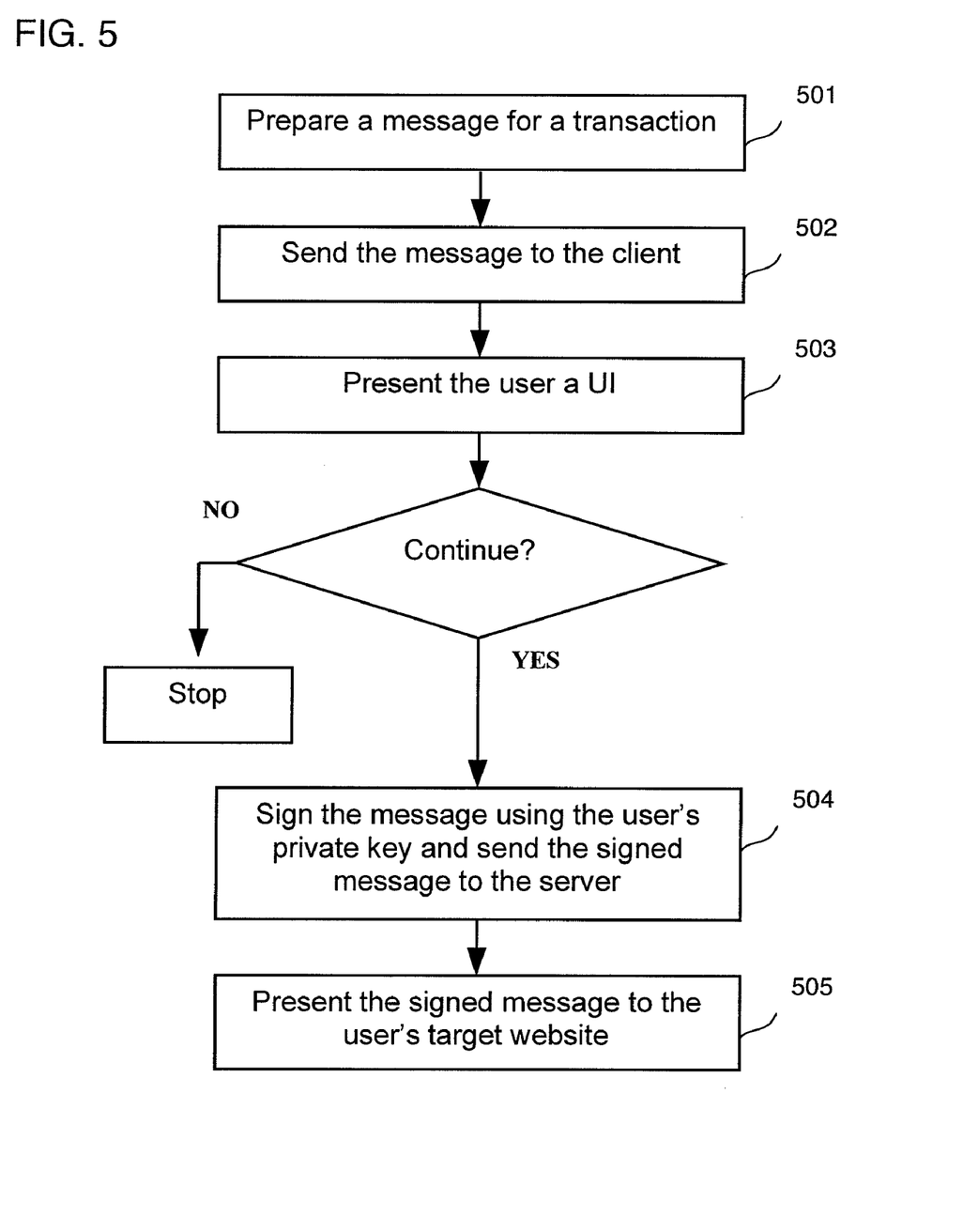
FIG. 5 is a block diagram illustrating a protocol that allows the user to approve both of these transactions in a secure manner according to the invention.

FIG. 5 is a block diagram illustrating a protocol that allows the user to approve both of these transactions in a secure manner. The protocol comprises the following steps:

Step 501: The server prepares a message that describes the intended transaction. For example, the message may describe a billing transaction of $20 for a book or it may describe an approval transaction for receiving auction related notifications;

Step 502: The server sends the message to the client;

Step 503: The client presents a user interface describing the intended transaction to the user, asking the user to make a yes/no decision;

Sept 504: If the user chooses Y, the client signs the message using the user's private key and sends it to the server. Both the client and the server seed the message with random values before signing to avoid replay attacks; and Step 505: The server now has the user's signature for the transaction and may proceed to present that to a third party (for example a bank or a notifications service).

The preferred embodiments disclosed herein have been described and illustrated by way of example only, and not by way of limitation. Other modifications and variations to the invention will be apparent to those skilled in the art from the foregoing detailed disclosure. While only certain embodiments of the invention have been specifically described herein, it will be apparent that numerous modifications may be made thereto without departing from the spirit and scope of the invention.

Accordingly, the invention should only be limited by the Claims included below.

The invention claimed is:

1. In an Internet based network comprising at least one server and at least one client which enables users to communicate with said at least one server, a method for encrypted communications using private keys and certificates, comprising steps of:

(a) a user choosing a username and a passphrase via said at least one client;

(b) said at least one client generating a private key and a public key using random data collected from said user and other sources that cannot be accessed by said at least one server;

(c) calculating a first hash value of said passphrase using an algorithm;

(d) calculating an authentication value based on said private key and said passphrase, wherein said authentication value comprises a separate entity distinct from said private key and said passphrase;

(e) concatenating said private key and said authentication value, and encrypting said private key concatenated with said authentication value using said passphrase;

(f) submitting said username, along with said first hash value, said encrypted private key concatenated with said authentication value, and said public key to said at least one server over a secure channel;

(g) said at least one server checking whether a record of said user exists in a database associated with said at least one server;

(h) if a check result of (g) is yes, then verifying access to said user's record by comparing said first hash value with a stored hash value of said passphrase;

(i) if a check result of (g) is no, then creating a record for said user;

(j) creating and signing a certificate that certifies said username and said public key;

(k) storing said first hash value, said encryption result and said certificate in said user's record; and (l) returning a confirmation to said at least one client.

2. The method of claim 1, wherein the steps (a)-(l) are performed in the order recited.

3. The method of claim 1, wherein said authentication value is an HMAC value, said passphrase being used as a key input and said private key being used as a message input to an HMAC algorithm.

4. The method of claim 1, wherein said authentication value is a second hash value of said passphrase calculated using an algorithm different from the algorithm that was used for calculating said first hash value of said passphrase.

5. The method of claim 1, wherein said authentication value is a different passphrase.

6. The method of claim 1, wherein said other sources comprise any of:
  timestamp;
  white noise device;
  audio input device; and
  video input device.

7. An Internet based network for secure communications using private keys and certificates, comprising:
  at least one server; and
  at least one client via which a user logs in said network by entering a username and a passphrase;
  wherein said at least one client is operable to:
    generate a private key and a public key using random data collected from said user and other sources that cannot be accessed by said at least one server;
    calculate a hash result of said passphrase using an algorithm;
    calculate an authentication value based on said private key and said passphrase, wherein said authentication value comrprises a separate entity distinct from said private key and said passphrase;
    concatenate said private key and said authentication value, and encrypt said private key concatenated with said authentication value using said passphrase;
    submit said username, along, with said hash result, said encrypted private key concatenated with said authentication value and said public key to said at least one server over a secure channel;
  wherein said at least one server is operable to:
    check whether a record of said user exists in a database associated with said at least one server;
    if the check result is yes, verify access to said user's record by comparing said hash result with a stored hash value of said passphrase;
    if the check result is no, create said record for said user;
    create and sign a certificate that certifies said username and said public key;
    store said hash result and said certificate in said user's record; and
    return a confirmation to said at least one client.

8. The network of claim 7, wherein said authentication value is an HMAC value, said passphrase being used as a key input and said private key being used as a message input to an HMAC algorithm.

9. The network of claim 7, wherein said, authentication value is a second hash value of said passphrase calculated using an algorithm different from the algorithm used for calculating said hash result of said passphrase.

10. The network of claim 7, wherein said authentication value is a different passphrase.

11. The network of claim 7, wherein said other sources comprise any of:
  timestamp;
  white noise device;
  audio input device; and
  video input device.

* * * * *